US007821757B2

(12) United States Patent
Lagnoux et al.

(10) Patent No.: US 7,821,757 B2
(45) Date of Patent: Oct. 26, 2010

(54) DEVICE FOR PROVIDING PROTECTION AGAINST OVERVOLTAGES WITH SOLDERLESS CONTACTS AND CORRESPONDING MANUFACTURING METHOD

(75) Inventors: Alain René Robert Lagnoux, Rabastens de Bigorre (FR); Hervé Lindeperg, Pau (FR); Olivier Louis André Kostrzewski, Clermont I'Hérault (FR)

(73) Assignee: ABB France, Rueil-Malmaison Cedex (FR)

( * ) Notice: Subject to any disclaimer, the term of this patent is extended or adjusted under 35 U.S.C. 154(b) by 874 days.

(21) Appl. No.: 11/678,461

(22) Filed: Feb. 23, 2007

(65) Prior Publication Data

US 2007/0217107 A1 Sep. 20, 2007

(30) Foreign Application Priority Data

Feb. 24, 2006 (FR) .................................. 06 01680

(51) Int. Cl.
*H02H 3/22* (2006.01)
*H01R 4/28* (2006.01)

(52) U.S. Cl. ...................................... 361/118; 439/792

(58) Field of Classification Search ................ 361/118; 439/792

See application file for complete search history.

(56) References Cited

U.S. PATENT DOCUMENTS 3,660,799 A * 5/1972 Tinkelenberg et al. ...... 439/526
4,966,563 A * 10/1990 Pierce et al. ................ 439/729
5,162,765 A 11/1992 DiVincenzo et al.
5,276,422 A * 1/1994 Ikeda et al. .................. 337/28

FOREIGN PATENT DOCUMENTS

DE 10120677 11/2002
EP 1126487 8/2001
FR 2846478 4/2004

OTHER PUBLICATIONS

International Standard IEC 61643-1; Second Edition; 2005; p. 25.
Office Action; The State Intellectual Property Office of China; Chinese Patent Application No. 200710085851.0; Jul. 12, 2010.

* cited by examiner

*Primary Examiner*—Stephen W Jackson
*Assistant Examiner*—Scott Bauer
(74) *Attorney, Agent, or Firm*—Jason A. Bernstein; Barnes & Thornburg LLP

(57) ABSTRACT

A device (1) for providing protection for an electrical installation against overvoltages including at least one protection component (2), the device having a first mounting (14) delimiting a first interstitial space (14') with a dimension fixed by construction that at least partially houses a first conducting element (10) and a second conducting element (11) to make the electrical connection between the first conducting element and the second conducting element, the device also having a second mounting (15) delimiting a second interstitial space (15') with a dimension fixed by construction that at least partially houses a third conducting element (12) and a fourth conducting element (13) so as to make the electrical connection between the third conducting element and the fourth conducting element.

20 Claims, 2 Drawing Sheets

DEVICE FOR PROVIDING PROTECTION AGAINST OVERVOLTAGES WITH SOLDERLESS CONTACTS AND CORRESPONDING MANUFACTURING METHOD

PRIORITY CLAIM

This patent application claims priority to French Patent Application No. 06 01680, filed Feb. 24, 2006, the disclosure of which is incorporated herein by reference in its entirety.

FIELD OF THE INVENTION

The present invention relates to devices for providing protection for electrical installations and equipment against electrical overvoltages, particularly surges and, in particular, due to lightning.

More particularly, the present invention relates to a device for providing protection for an electrical installation against overvoltages.

The present invention also relates to a method of manufacturing a device for providing protection for an electrical installation against overvoltages.

BACKGROUND OF THE INVENTION

Devices for providing protection for electrical or electronic instruments against overvoltages, for example, resulting from lightning phenomena, are well known.

These protection devices generally comprise one or several components providing protection against overvoltages, for example, such as a varistor or a spark gap, provided with power supply terminals used to electrically connect them to the installation to be protected. When the protection components are exposed to voltages exceeding a predetermined threshold value, the protection components allow a discharge current to flow to earth while clipping the overvoltage to a value compatible with the resistance of the installation and the equipment connected to the installation. These components and devices are generally referred to as “surge arresters” or “lightning arresters”.

For obvious safety reasons, and particularly to limit risks of electrocution or short circuits, it is known that protection devices can be provided with an insulating box capable of electrically and mechanically separating the internal devices in the protection devices, such as the protection component, from the environment in which these protection devices are used.

In general, these boxes are standard sized adapted to modular use within standardised electrical switchboards.

An electrical connection interface is necessary between the outside and the inside of the box in order to be able to electrically connect the protection component to the electrical installation to be protected.

It is known that this can be done using connection pads at which an electrical junction can be made with a conducting element outside the box, such as a cable or a rail. In particular, the connection pads may be housed in the box, they may be accessible from the outside of the box through orifices formed in the box and include a mechanical clamping system using conducting jaws giving a secure locking of the electrical junction, for example, by screwing.

Moreover, it is necessary to electrically connect the protection components to the connection pads inside the box. This is usually done by providing the protection devices with connection elements making the connection between the power supply terminals of the protection components and the connection pads.

In general, these connection elements are in the form of a set of conducting strips or plates, preferably metallic.

It is known that permanent junctions such as built-in junctions can be used with various assembly methods to electrically connect a metallic strip to a connection pad, or several metallic strips to each other, within a lightning arrester.

The permanent junctions must be sufficiently large and the quality of the permanent junctions must be sufficiently good to resist mechanical and thermal stresses generated by the passage of discharge currents that can circulate through the protection component during normal operation of the protection device.

In particular, it is known that thermal assembly methods, such as electrical brazing or soldering, can be used, particularly spot welding or induction welding.

These assembly methods provide satisfactory results for the mechanical strength and electrical resistance of the junctions with regard to discharge currents; however, these assembly methods suffer from non-negligible disadvantages.

In particular, welding, soldering and brazing methods frequently require complex and expensive equipment and tooling that require regular maintenance, such as tunnel furnaces and wave soldering machines.

Furthermore, the use of some of these methods, for example, soldering with an iron, requires action by highly qualified operators. In this case, the assembly quality is dependent on the dexterity of the operator and, consequently, the reproducibility is uncertain.

Finally, welding, soldering and brazing operations frequently require the use of polluting substances such as lead, or irritating substances such as deoxidation fluxes, and these substances are potentially harmful to the environment and to the health of the operators making it essential to use complex and expensive protection systems for suction and treatment of the substances.

SUMMARY OF THE DISCLOSURE

The features of the present invention correct the different disadvantages listed above and propose a new device for providing protection of an electrical installation against overvoltages with a particularly simple and reliable design.

Another feature of the present invention is a device for providing protection against overvoltages that is particularly inexpensive to manufacture.

Another feature of the present invention is a device for providing protection against overvoltages that creates only small amounts of pollution during manufacturing.

Another feature of the present invention is a new particularly simple and inexpensive method for manufacturing a device for providing protection against overvoltages.

The features of the present invention are achieved using a device for providing protection of an electrical installation against overvoltages including at least one protection component with at least one first and one second power supply terminal; at least one first and one second connection pad making the electrical connection of the device to the electrical installation; at least one first conducting element electrically connected to the first terminal of the protection component and one second conducting element electrically connected to the first connection pad, the first and second conducting elements are electrically connected to each other; and at least one third conducting element electrically connected to the second terminal of the protection component and one fourth conducting element electrically connected to the second connection pad, the third and fourth conducting elements are electrically connected to each other; the device further comprises a first mounting delimiting a first interstitial space with a dimension fixed by construction that at least partially houses the first conducting element and the second conducting element, the size of the first interstitial space being such that the first and second conducting elements are held in contact with each other to make the electrical connection between them, and in that the device includes a second mounting delimiting a second interstitial space with a dimension fixed by construction that at least partially houses the third conducting element and the fourth conducting element, the dimension of the second interstitial space being such that the third and fourth conducting elements are held in contact with each other to make the electrical connection between them.

The features of the present invention are also achieved by means of a method for manufacturing a device for providing protection of an electrical installation against overvoltages including at least one protection component with at least one first and one second power supply terminal; at least one first and one second connection pad that electrically connect the device to the electrical installation; at least one first conducting element electrically connected to the first terminal of the protection component and one second conducting element electrically connected to the first connection pad; and at least one third conducting element electrically connected to the second terminal of the protection component and one fourth conducting element electrically connected to the second connection pad; the method further comprising a step (a) during which the first conducting element and the second conducting element are at least partially inserted into a first interstitial space with dimensions fixed by construction and delimited by a first mounting, such that the first and second conducting elements are held in contact with each other to make the electrical connection between them; the method further comprising a step (b) during which the third conducting element and the fourth conducting element are at least partially inserted into a second interstitial space with dimensions fixed by construction and delimited by a second mounting, such that the first and second conducting elements are held in contact with each other to make the electrical connection between them.

BRIEF DESCRIPTION OF THE DRAWINGS

Other features and advantages of the present invention become clearer after reading the description with reference to the figures, which are provided for illustrative purposes only and are in no way limiting.

DETAILED DESCRIPTION OF THE EMBODIMENTS

Figure 1:
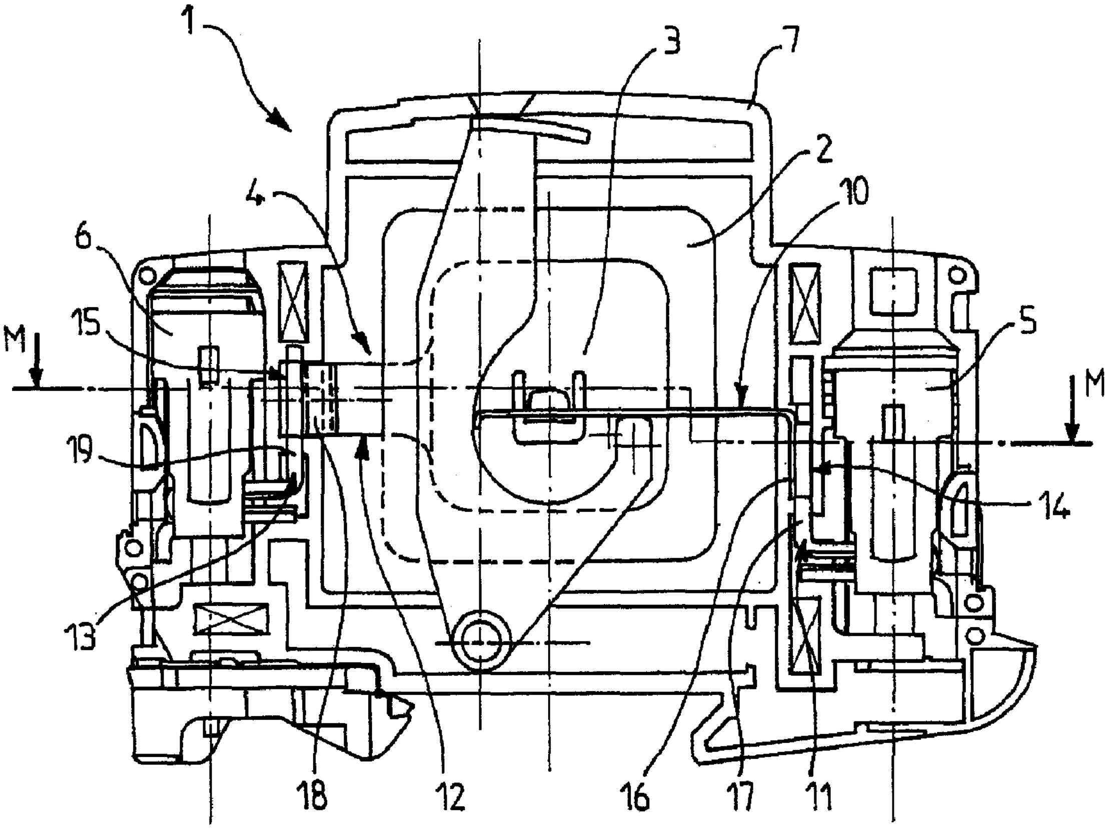
FIG. 1 is a front sectional view of a protection device according to the present invention.

The device 1 according to one embodiment of the present invention for providing protection of an electrical installation against overvoltages is designed to be connected in parallel on the electrical installation to be protected.

For purposes of the present invention, the term "electrical installation" refers to any type of apparatus or network with an electrical power supply that might be subjected to voltage disturbances, and particularly voltage surges (transient overvoltages) due to lightning.

The device 1 can advantageously be used to form a lightning arrester.

The device 1 is advantageously designed to be placed between a phase of the installation to be protected and the earth. It is also possible, without departing from the scope of the present invention, that instead of being connected in parallel between a phase and the earth, the device 1 could be connected between the neutral and the earth, between the phase and the neutral, or even between two phases in order to provide a differential protection.

The device 1 includes at least one protection component 2 electrically connected to the electrical installation to protect the electrical installation from overvoltages, and particularly surges. In particular, the protection component 2 may be formed indifferently by a varistor or a spark gap. For the purpose of the present disclosure, each component 2 for protection against overvoltages is connected to be preferably formed by a varistor; however, the use of a varistor is only a preferred example and in no way forms a limitation to the present invention.

In order to enable the protection component 2 to be electrically connected to the installation to be protected, the protection component 2 has at least a first power supply terminal 3 and a second power supply terminal 4. Preferably, the varistor 2 is in the form of an orthogonal parallelepiped substantially flat in shape, the first and second power supply terminals possibly being formed by metallic plates projecting on the faces of the orthogonal parallelepiped.

The device 1 also includes a first connection pad 5 and a second connection pad 6, the pads are designed to electrically connect the device to the electrical installation. The geometry, dimensions and the number of component parts of the pads can naturally vary without departing from the scope of the present invention.

Preferably, the device 1 includes a box 7 inside which the protection component 2 is mounted. The box 7 will preferably be made from an insulating material arranged to electrically and mechanically separate some constituent elements of the device, such as the protection component 2, from the environment in which the device 1 is used. The components of the protection device thus protected within the box 7 are hereinafter referred to as "internal parts".

Thus, the box 7 will be capable of facilitating manipulation and use of the device 1 while limiting the risks of short circuits or electrocution related to these operations.

In particular, the box 7 may be formed from a first hollow side plate 7A and a second side plate 7B assembled in contact with each other substantially along the sagittal plane of the box 7. For the purposes of the present disclosure, the first side plate 7A acts as a support for the varistor 2 and the connection pads 5, 6; however, this is not a limitation to the present invention.

Therefore, according to the present invention, the connection pads 5, 6 advantageously form electrical connection interfaces between the internal parts and the electrical installation to be protected, in other words, means of making an electrical connection between the inside and outside of the box 7.

Preferably, the pads are housed entirely within the box 7 and may, for example, include screw jaws arranged facing orifices cut out in the box 7 to enable insertion and then support by clamping of elements of stripped cables or cables previously crimped in the lugs. Parts of the connection pads could project outside the box 7, for example, to form pins, without departing from the scope of the present invention.

The device 1 also includes at least one first conducting element 10 electrically connected to the first terminal 3 of the protection component 2, and one second conducting element 11 electrically connected to the first connection pad 5. The first and second conducting elements 10, 11 are electrically connected to each other to electrically connect the first terminal 3 of the protection component 2 to the first connection pad 5.

The device 1 also includes at least one third conducting element 12 electrically connected to the second terminal 4 of the protection component 2 and to one fourth conducting element 13 electrically connected to the second connection pad 6. In order to electrically connect the second terminal 4 to the connection pad 6, the third and fourth conducting elements 12, 13 are electrically connected to each other.

According to one important feature of the present invention, the device 1 includes a first mounting 14 delimiting a first interstitial space 14' with dimension fixed by construction that at least partially houses the first conducting element 10 and the second conducting element 11, the dimension of the first interstitial space 14' being such that the first and second conducting elements are held in contact with each other to make the electrical connection between them.

According to another important feature of the present invention, the device 1 includes a second mounting 15 delimiting a second interstitial space 15' with dimension fixed by construction that at least partially houses the third conducting element 12 and the fourth conducting element 13, the dimension of the second interstitial space being such that the third and fourth conducting elements are held in contact with each other in order to make the electrical connection between them.

In the following, geometric, physical and functional considerations applicable to the first conducting element 10, to the second conducting element 11, to the first mounting 14 and to the first interstitial space 14', and to any combination of these entities, may be applied to the third conducting element 12, to the fourth conducting element 13, to the second mounting 15 and to the second interstitial space 15' respectively, and to a corresponding combination of these entities.

For purposes of the present disclosure, the term "mounting" refers to an element or set of elements with a housing in the form of an "interstitial space" capable of at least partly housing the first and second conducting elements, or the third and fourth conducting elements, respectively, providing a mechanical support function for these conducting elements and making an electrical junction between them. Preferably, the mounting will enable assembly of the conducting elements so they are held in contact with each other, substantially immobile with respect to each other.

In particular, the mounting will provide an electrical connection between the conducting elements that is capable of resisting the thermal and mechanical effects of discharge currents that may pass through the protection component 2 and the conducting elements 10, 11, 12, 13 when the device 1 clips overvoltages. In particular, the mounting will preferably be fixed for this purpose by a built-in connection with the box 7.

According to one exemplary variant embodiment, the first and/or second mounting(s) may comprise one or several mechanical lining parts, in particular, distinct from the box 7, for example, such as clamps, thickness shims or separating wedges.

However, according to one preferred exemplary variant embodiment, the first mounting 14 and/or the second mounting 15 is made from the same material as the box 7 (in one piece), and even more preferably as the first side plate 7A.

More precisely, the first and second mountings 14, 15 may be composed of bumps projecting from the bottom 7'A of the side plate 7A, the bumps including a slit or a groove extending preferably substantially in a plane normal to the bottom of the side plate to form the corresponding interstitial spaces 14', 15'.

For purposes of the present disclosure, the phrase "dimension fixed by construction" means that the dimension of the interstitial spaces (14', 15') is finite and is determined by a fixed geometry of the mountings (14, 15), and particularly fixed prior to installation of the conducting elements. Thus, in order to define the limits of its interstitial space, each mounting will preferably include either a single part or several parts rigidly fixed with respect to each other.

According to the present invention, the dimensions of the mountings alone, and more particularly the dimensions of the interstitial spaces associated with them compared with the dimensions and the geometry of the conducting elements to be electrically connected, guarantees that an electrical connection is made between the conducting elements.

Thus, in a particularly preferred exemplary embodiment, the junction between the first conducting element 10 and the second conducting element 11 at the first mounting is made simply by bringing the first and second conducting elements into contact, preferably by overlapping them, within the interstitial space 14', for example, without using any screwing, riveting, clinching, brazing or soldering method.

In particular, the electrical and/or mechanical connection between the first conducting element 10 and the second conducting element 11, and the electrical and/or mechanical connection between the third conducting element 12 and the fourth conducting element 13, is achieved without brazing or soldering.

In one particularly preferred exemplary embodiment, no auxiliary clamping or reinforcement means is necessary to assure good resistance of the electrical and/or mechanical connection made.

According to a first exemplary embodiment, the first conducting element (10) and the second conducting element (11) may be force fitted into the first mounting (14).

For purposes of the present disclosure, the phrase "force fitted" means that the operation to place conducting elements in their corresponding mountings, and more precisely within the corresponding interstitial spaces, requires application of a significant mechanical force, the force causing deformation of the mountings and/or conducting elements such that when the conducting elements are installed in the functional position in the mountings, the conducting elements are held in contact with each other by a residual elastic stress that, in particular, creates a clamping pressure.

For purposes of the present disclosure, the phrase "Functional position" refers to the position occupied by conducting elements within the protection device 1 when the conducting elements are housed and electrically connected in their corresponding mountings and are capable of fulfilling their electricity conducting function between the connection pads and the power supply terminals.

Thus, according to this first exemplary embodiment, the dimensions of the interstitial space 14' at rest compared with the dimensions of the first and second conducting elements 10, 11 at rest is such that there is a mechanical interference between the conducting elements 10, 11 and the mounting 14 that delimits the interstitial space 14'. This interference, in other words, this "negative clearance," results in a tight assembly, the conducting elements 10, 11 are driven into the first mounting 14 and are held in place under the effect of the opposing deformation stresses mutually applied between the mounting and the conducting elements.

In other words, a clamping pressure is developed resulting from the insertion of the two conducting elements 10, 11 into the mounting 14, so that the global dimensions of the conducting elements at rest significantly exceeds the interstitial space 14' available at rest, in other words, the global dimensions of the conducting elements at rest exceed the accommodation capacity of the mounting at rest.

For purposes of the present disclosure, the phrase "at rest" refers to the state of the conducting elements 10, 11, and also the first mounting 14, before the conducting elements are inserted into the mounting to occupy their functional position within the protection device 1. In other words, the "at rest" state corresponds to the state in which the mountings and the conducting elements are not subjected to any deformation or stress.

Similarly and independently, the third conducting element and the fourth conducting element may be force fitted into the second mounting 15.

According to a second exemplary embodiment, the first conducting element 10 and the second conducting element 11 substantially fit into the first mounting 14 at zero stress.

In other words, in this second exemplary embodiment, the dimension of the interstitial space 14' at rest compared with the dimensions of the first and second conducting elements 10, 11 at rest is such that there is practically zero clearance between the conducting elements 10, 11 and the mounting 14 that delimits the interstitial space 14'.

Similarly, the third conducting element and the fourth conducting element may be adjusted to fit into the second mounting 15 at substantially zero stress.

A satisfactory electrical contact can be maintained between the first and the second conducting element, and between the third and the fourth conducting element, by limiting the relative clearance of the conducting elements by a simple and precise guidance of the conducting elements within their corresponding mountings but without clamping. For purposes of the present disclosure, the phrase "satisfactory electrical contact" refers particularly to an electrical connection for which the electrical resistance is sufficiently low so that the electrical resistance does not significantly disturb normal operation of the device 1.

When an electrical current passes through the protection component 2 and, consequently, through the conducting elements 10, 11, 12, 13 and their corresponding connections, the conducting elements and the connections that have a intrinsic electrical resistance that is non-zero, even if it is low, can increase in temperature due to the Joule effect.

However, during normal operation of the protection device 1 and in the absence of any overvoltage phenomenon, the intensity of the electrical current that passes through the protection component 2 and, consequently, through the conducting elements 10, 11, 12, 13 is negligible or even practically zero. Furthermore, a discharge current, for example, caused by an overvoltage related to a lightning phenomenon, has a high intensity but a very short duration. In both cases, it is tolerable that electrical connections have some resistance, provided that the energy that is dissipated by the Joule effect can be evacuated without creating any danger for the device 1.

Thus, the absence of a permanent high intensity current within the device 1 enables some tolerance with regard to the range of resistance values allowable for the connections. Consequently, electrical connections made simply by bringing conducting elements into contact are possible without attempting to connect them more intimately by applying a clamping force designed to minimize the electrical resistance at their interface.

Without departing from the scope of the present invention, it would be possible to make a device 1 combining the two embodiments described above, for example, by force fitting the first and second conducting elements 10, 11 into a first mounting 14 and adjusting the third and fourth conducting elements 12, 13 at practically zero stress in the second mounting 15, or vice versa.

The change from the first variant to the second variant can be done spontaneously with aging of the device 1, in the case in which one mounting and/or both mountings, initially stressed, relaxes gradually by creeping. In other words, it is possible that a tight mounting will change with time to become a loose mounting, deformation of the mounting and, more particularly, enlargement of the interstitial space being accompanied by a reduction in the clamping pressure, significantly but acceptably reducing the clamping pressure.

According to one preferred exemplary variant embodiment, the conducting elements to be connected to these mountings are separate and independent from each other before they are mounted within the device.

It is also possible if the conducting elements that will be connected to each other have conjugate shapes that, for example, connect them together by loosely fitting them to each other before their insertion under stress.

According to one exemplary variant embodiment, one or more conducting elements 10, 11, 12, 13 may be formed by the combination of several parts independent from each other or mechanically fixed or articulated to each other. As an illustrative and non-limitative example, it is possible that the first mounting 14 can hold an assembly comprising a part forming a first conducting element 10 and two parts forming the second conducting element 11, for example, one of the two parts of the second conducting element acting as an insertion shim, without departing from the scope of the present invention.

However, each conducting element is preferably in the form of a single part at the corresponding mountings.

Figure 3:
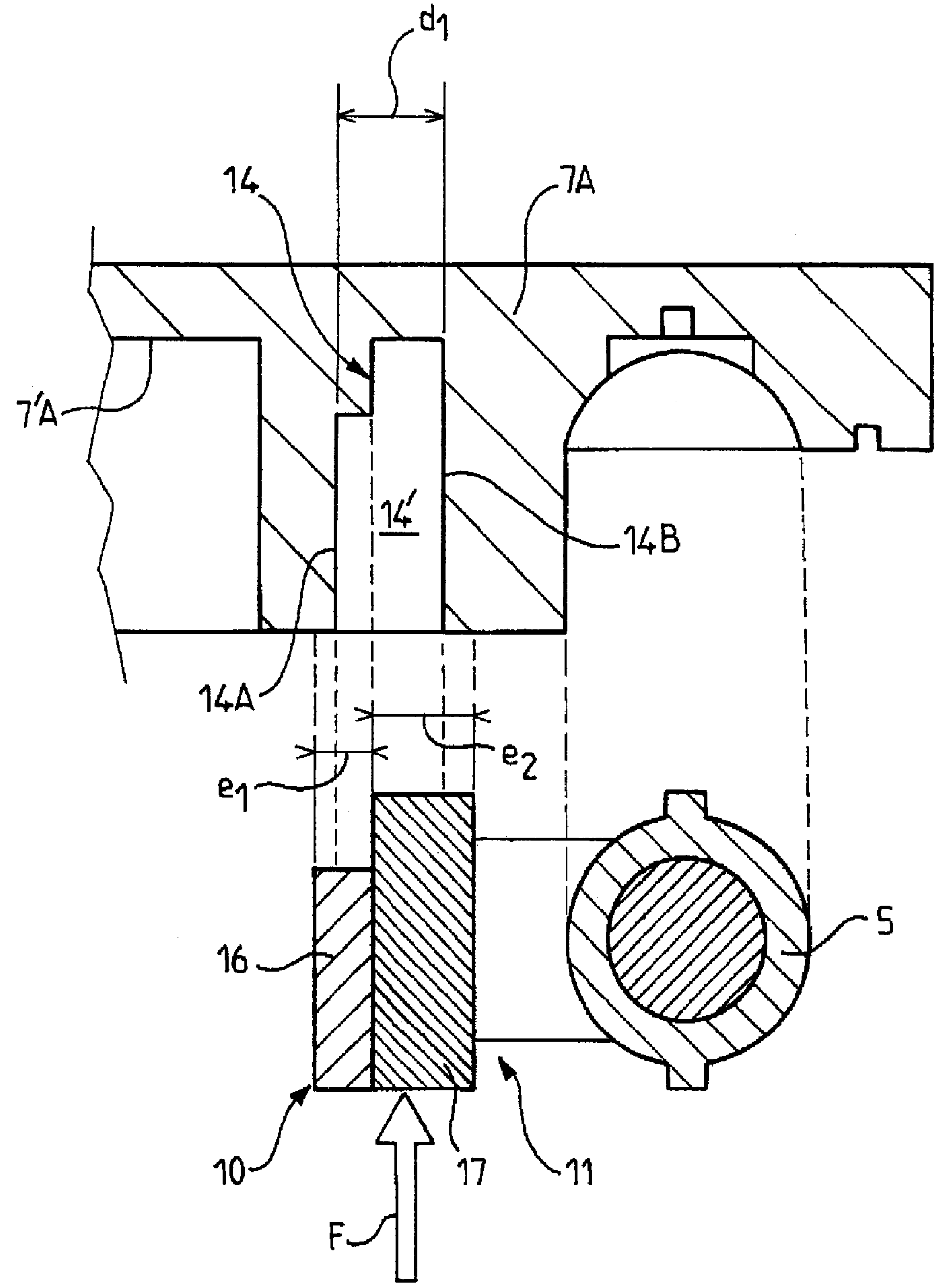
FIG. 3 is a simplified partial top sectional view showing assembly by insertion of a first and a second conducting element within a first mounting of a device according to the present invention.

According to one preferred exemplary variant embodiment illustrated in FIG. 3, the first mounting 14 includes two walls 14A, 14B extending substantially parallel to each other and delimiting the first interstitial space 14', the dimension of the first interstitial space 14' at rest is equal to the distance di separating the walls 14A, 14B before insertion of the first and second conducting elements.

Similarly, the second mounting 15 may comprise two walls 15A, 15B extending substantially parallel to each other and delimiting the second interstitial space 15', the dimension of the second interstitial space 15' at rest is equal to the distance $d_2$ (not shown) separating the walls 15A, 15B before insertion of the third and fourth conducting elements.

Even more preferably, the walls 14A and 14B, and 15A and 15B project from the bottom 7'A of the side plate 7A of the box and extend substantially along planes perpendicular to the bottom 7'A.

Furthermore, according to one preferred exemplary variant embodiment, the first conducting element 10 and the second conducting element 11 are formed by a first conducting strip 16 and a second conducting strip 17 respectively, preferably metallic, the thicknesses of the strips at rest are equal to $e_1$ and $e_2$, respectively, as illustrated in FIG. 3.

Similarly, according to one preferred exemplary variant embodiment, the third conducting element 12 and the fourth conducting element 13 are formed by a third conducting strip 18 and a fourth conducting strip 19, thicknesses of the strips at rest are denoted $e_3$ and $e_4$, respectively (not shown).

Particularly advantageously, when the conducting strips do not need to have a particular elastic nature, the conducting strips may be made from almost pure copper, particularly from an alloy for which the copper content is greater than or equal to 99%, without the need for more expensive alloys such as Cu—Be.

For example, in the exemplary variant embodiment shown in FIG. 1, the electrical and mechanical connection between the first conducting element 10 and the first power supply terminal 3 is preferably made by a heat sensitive means capable of releasing a part of the conducting element 10 if the varistor 2 overheats, so that this part of the first conducting element 10 can move substantially parallel to one of the main extension faces of the varistor 2, preferably in rotation, to isolate the varistor from the electrical installation. Preferably, this thermal disconnection means will be made using a first conducting strip 16 wherein the intrinsic elasticity will enable the conducting strip 16 to bend like a spring, the first strip 16 is prestressed when the first conducting element 10 is electrically connected to the first power supply terminal 3. However, the other conducting strips 17, 18 and 19 do not require any particular elasticity in this particular exemplary embodiment, and the second, third and fourth conducting strips may be made from a relatively inexpensive alloy containing more than 99% copper.

The present invention is not limited to a particular geometry of the conducting strips. In particular, the conducting strips may, for example, be corrugated or curved sections, swellings, baffles, notches or projecting elements without departing from the scope of the present invention.

However, in one preferred exemplary variant embodiment, conducting strips will be used in which portions designed to be integrated into the mountings are substantially plane and have a uniform thickness.

Figure 2:
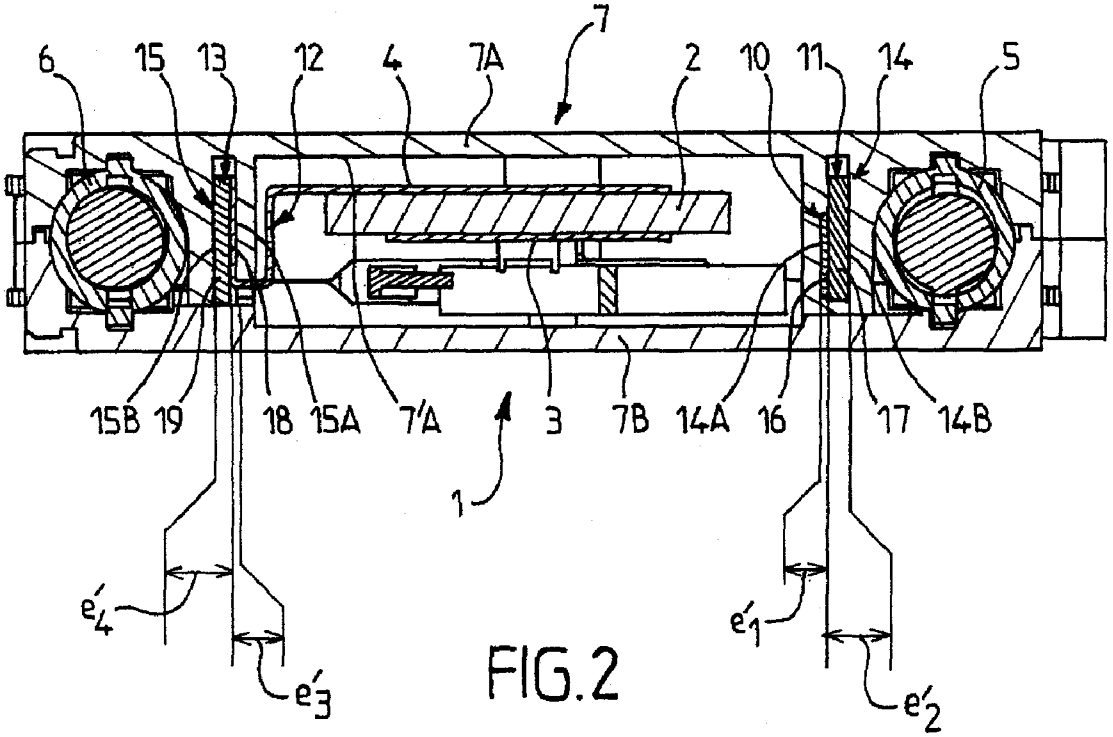
FIG. 2 is a top sectional view along line M-M of the device in FIG. 1.

According to one preferred exemplary variant embodiment shown in FIGS. 1-3, the first interstitial space will be formed by a staged groove in which the first and second conducting elements overlap. It is preferred to use a first conducting strip 16 and a second conducting strip 17 substantially more rigid than the first mounting 14 so that insertion of the conducting strips 16, 17 causes a deformation of the first mounting 14 by a wedge effect, and more precisely produces a separation or compression of the walls 14A, 14B of this mounting, in other words, an increase in the first interstitial space 14' under stress. As shown in FIG. 3, this is preferably achieved by choosing the dimension $d_1$, at rest of the first interstitial space 14' to be significantly lower than the sum $e_1+e_2$ of the thicknesses at rest of the first and second conducting strips.

Similarly, the dimension $d_2$ of the second interstitial space 15' at rest is preferably chosen to be significantly less than the sum $e_3+e_4$ of the thicknesses of the third and fourth conducting strips at rest.

According to one exemplary variant embodiment not shown, the first and/or second mounting may include a clamp with a substantially U-shaped section in which the arms can move apart by an elastic deformation during insertion of the first and second conducting elements 10, 11 into the third and fourth conducting elements 12, 13, respectively.

According to another exemplary variant embodiment not shown, it is possible that the first mounting 14 is made from a housing formed directly in the first conducting element 10 or in the second conducting element 11, so that the conducting elements 10, 11 can be inserted directly one into the other, particularly under stress. In particular, it would be possible to preform the second conducting strip 17 so that the second conducting strip 17 has a portion of a U-shaped section between the arms of which one end of the first conducting strip 16 may be slid, or the second conducting strip 17 may have a cylindrical geometry so as to clamp substantially concentric conducting elements.

Similarly, it is possible for the second mounting 15 to be made of the same material (in one piece) as the third conducting element 12 or the fourth conducting element 13.

In the exemplary variant embodiment shown in FIGS. 1-2, the assembly of the first conducting element 10 with the second conducting element 11, and the assembly of the third conducting element 12 with the fourth conducting element 13 may advantageously be reversible, particularly because the arrangement of the conducting elements enables extraction and separation of the elements outside the corresponding mountings.

However, according to one exemplary variant embodiment not shown, it is possible to provide the mountings and/or conducting elements with non-return means to prevent extraction and separation of the conducting elements after the conducting elements have been inserted in their corresponding mountings. In particular, it would be possible to make studs or depressions in the conducting elements, for example, by punching, the studs or depressions, then cooperating with notches or tabs arranged for this purpose in the mounting, particularly at the walls delimiting the air gap.

Finally, the mountings themselves may indifferently be electrically insulating or conducting without departing from the scope of the present invention.

The manufacturing method for a preferred exemplary variant embodiment of the device 1 according to the present invention for providing protection will now be described.

One exemplary manufacturing method applies to a device 1 for providing protection for an electrical installation against overvoltages including at least one protection component 2 with at least one first and one second power supply terminal 3, 4, at least one first and one second connection pad 5, 6 to make the electrical connection of the device 1 to the electrical installation, at least one first conducting element 10 electrically connected to the first terminal 3 of the protection component and a second conducting element 11 electrically connected to the first connection pad 5, at least one third conducting element 12 electrically connected to the second terminal 4 of the protection component and a fourth conducting element 13 electrically connected to the second connection pad 6.

One exemplary method for manufacturing a protection device according to the present invention includes a step (a) during which the first conducting element 10 and the second conducting element 11 are at least partially inserted into a first interstitial space 14' with dimension fixed by construction and delimited by a first mounting 14, so that the first and second conducting elements 10, 11 are held in contact with each other in order to make the electrical connection between the first and second conducting elements 10, 11.

More particularly, substantially plane conducting strips will be used that are placed adjacent to each other in the corresponding mountings according to the main extension plane in order to obtain an extended and stable regular connection.

As shown in FIG. 3, the edges of the first conducting strip 16 and the second conducting strip 17 can be inserted between the walls 14A, 14B that delimit the first interstitial space 14', one after the other or both at the same time.

In order to make the strips 16, 17 penetrate between the walls 14A, 14B, a penetration force F is applied that tends to make the strips 16, 17 penetrate into the mounting 14, practically in the direction towards the bottom 7'A in FIG. 3.

Preferably, the step (a) includes a sub-step ($a_1$) during which the first conducting element 10 and the second conducting element 11 are force fitted into the first mounting 14. This sub-step results in a tight assembly.

The first and second conducting strips are chosen so that the total thickness $e_1+e_2$ is significantly greater than the separation between the walls 14A, 14B at rest, in other words, the dimension of the first interstitial space 14' at rest.

In one preferred exemplary embodiment in which the conducting strips are stiffer than the mounting 14, insertion of the strips between the walls 14A, 14B creates a wedge effect that tends to separate the walls 14A, 14B from each other, in other words, to increase the dimension of the first interstitial space 14' to make the interstitial space 14' correspond substantially with the combined thickness $e_1+e_2$ of the first and second conducting strips. In other words, as shown in FIG. 2, the thicknesses $e'_1$ and $e'_2$ of the first and second conducting strips, respectively, considered after insertion of the strips into the first mounting 14 correspond substantially to the thicknesses of the strips $e_1$ and $e_2$ at rest.

According to the present invention, the dimensional adaptation of the first interstitial space 14' to the conducting elements induces a deformation of the first mounting 14 that results in the occurrence of an elastic stress that tends to oppose the deformation and to bring the walls 14A, 14B towards each other and, consequently, to compress the conducting strips 16, 17 in contact with each other.

Thus, sub-step ($a_1$) preferably includes a phase ($a_1$') during which the first mounting 14 is elastically deformed to increase the dimension of the first interstitial space 14'.

According to one exemplary variant embodiment, it is possible to deform the first mounting 14 before insertion of the conducting elements 10, 11, for example, using a separating wedge, and then freely insert the conducting elements between the walls 14A, 14B before releasing the walls so that they can return elastically and compress the conducting elements, for example, by removing the wedge.

Furthermore, according to one exemplary variant embodiment, the sub-step ($a_1$) may include a phase ($a_1$") during which the first and/or the second conducting element is deformed elastically during insertion of the conducting elements 10, 11 in the first mounting 14.

Phases ($a_1$') and ($a_1$") may take place simultaneously or independently of each other without departing from the scope of the present invention.

Furthermore, according to one important feature of the present invention, the method for manufacturing the device 1 includes a step (b) during which the third conducting element 12 and the fourth conducting element 13 are at least partially inserted into a second interstitial space 15' with dimension fixed by construction and delimited by a second mounting 15, so that the third and fourth conducting elements 12, 13 are held in contact with each other in order to make the electrical connection between the third and fourth conducting elements 12, 13.

In the same way as described above, step (b) may include a sub-step ($b_1$) during which the third conducting element 12 and the fourth conducting element 13 are force fitted into the second mounting 15.

Similarly, the sub-step ($b_1$) may include a phase ($b_1$') during which the second mounting (15) is deformed elastically to increase the dimension of the second interstitial space 15'.

In particular, as illustrated in FIG. 2, the third and fourth conducting strips 18, 19 could be chosen to be significantly stiffer than the second mounting 15, so that the corresponding thicknesses after insertion $e'_3$ and $e'_4$ are substantially equal to the corresponding thicknesses at rest $e_3$ and $e_4$.

Similarly, sub-step ($b_1$) may include a phase ($b_1$") during which the third and/or the fourth conducting element is elastically deformed during insertion of the conducting elements (12, 13) in the second mounting (15).

It is remarkable that considerations related to the methods of insertion of the first and second conducting elements into the first mounting 14 and the effects of the insertion are similarly applicable to insertion of the third and fourth conducting elements in the second mounting 15.

Preferably, the manufacturing method also includes a step (c) during which the box 7 designed to hold the protection component 2 is such that the first mounting 14 and/or the second mounting 15 are made from the same material as the box 7 (in one piece).

More particularly, the box will preferably be made from a thermoplastic material such as polyamide or polycarbonate, and even more preferably from a polycarbonate containing 20% of glass fibre.

Even more preferably, step (c) will include a sub-step ($c_1$) moulding a first side plate 7A. Particularly advantageously, the first side plate 7A will have a substantially plane bottom 7'A on which the protection component 2 can be added and fixed so that one of the main faces of the protection component extends parallel to the bottom 7'A. Preferably, the first side plate 7A will also include housings forming the first and second mountings 14, 15, the housings are delimited by walls made from the same material as the bottom 7'A and extend substantially along planes perpendicular to the bottom 7'A, except for the draft angles.

Advantageously, such an arrangement facilitates assembly of conducting elements in the corresponding mountings, by placing the conducting elements along a direction normal to the bottom 7'A, substantially the same as the direction used to place the protection component 2 into the side plate 7A.

If necessary, the housings of the mountings 14, 15 may also be ground by machining during a step (d) after step (cl) in order to guarantee a tight fit with the conducting strips.

In the above, notation conventions used to identify some particular steps in a manufacturing method conforming with the present invention do not in any way prejudge the order of execution or duration of the steps. For example, steps (a) and (b) may be done simultaneously or one after the other indifferently. Similarly, step (c) will preferably be done prior to the steps (a) and (b).

Furthermore, it is particularly remarkable that no reinforcing element such as a rivet or a solder point is necessary to keep the junctions made in good contact between the conducting elements within the device 1 according to the present invention. The value of the clamping force may advantageously be determined by fixing the nominal values and the corresponding tolerances of the dimension d, of the first interstitial space 14' at rest and the thicknesses $e_1$ and $e_2$ of the conducting strips 16, 17 at rest, particularly as a function of the elasticity of the constituent materials and the geometry of the mountings and the conducting elements.

First test campaigns have shown satisfactory behaviour of devices conforming to the present invention in which the conducting elements were force fitted into the corresponding mountings, used as lightning arresters under typical usage conditions, particularly, for example, for ratings of up to 70 kA 8/20.

Thus, the device according to the present invention advantageously has particularly simple-to-fit connections between conducting elements, while producing reliable and functional electrical and mechanical junctions.

Advantageously, the reduction in the number of parts necessary to make electrical connections between the protection component and the installation to be protected can reduce the cost price of the device particularly by limiting needs for raw materials and manufacturing and assembly operations.

Furthermore, the particular arrangement of the different elements making up the device 1 within the box 7 very much facilitates assembly because no complex tool and no particular qualification of the operator are necessary.

Furthermore, no polluting substance is used during execution of the assembly steps to make the electrical junctions between the conducting elements.

Finally, the simplicity of movements to bring the protection component 2, connection pads 5, 6 and conducting elements 10, 11, 12, 13 towards each other and positioning them during assembly, makes it relatively simple to automate the manufacturing method.

Thus, the device according to the present invention can advantageously combine optimized manufacturing cost with high performance and good reliability.

The invention claimed is:

1. A device for providing protection for an electrical power supply network against overvoltages, comprising:

(a) at least one protection component with at least one first and one second power supply terminal;

(b) at least one first and one second connection pad designed to provide electrical connection of the device to the electrical installation;

(c) at least one first conducting element electrically connected to the first terminal of the protection component and one second conducting element electrically connected to the first connection pad, the first and second conducting elements are electrically connected to each other;

(d) at least one third conducting element electrically connected to the second terminal of the protection component and a fourth conducting element electrically connected to the second connection pad, the third and fourth conducting elements are electrically connected to each other;

(e) a first mounting delimiting a first interstitial space with a dimension fixed by construction that at least partially houses the first conducting element and the second conducting element, the size of the first interstitial space is such that the first and second conducting elements are held in contact with each other to make the electrical connection between the first and second conducting elements; and (f) a second mounting delimiting a second interstitial space with a dimension fixed by construction that at least partially houses the third conducting element and the fourth conducting element, the dimension of the second interstitial space is such that the third and fourth conducting elements are held in contact with each other to make the electrical connection between the third and fourth conducting elements.

2. The device of claim 1, wherein the first conducting element and the second conducting element are force fitted into the first mounting and wherein the third conducting element and the fourth conducting element are force fitted into the second mounting.

3. The device of claim 1, wherein the first conducting element and the second conducting element are adjusted at practically zero stress in the first mounting and wherein the third conducting element and the fourth conducting element are adjusted at practically zero stress in the second mounting.

4. The device of claim 1, further comprising a box inside which the protection component is mounted and wherein the first mounting and the second mounting is made from the same material as the box.

5. The device of claim 1, wherein the protection component is formed by a varistor.

6. The device of claim 1, wherein the first mounting includes two walls extending substantially parallel to each other and delimiting the first interstitial space, the dimension of the first interstitial space at rest is equal to the distance $d_1$ separating the walls.

7. The device of claim 1, wherein the first and second mountings include a clamp with a substantially U-shaped section.

8. The device of claim 1, wherein the first and the second conducting elements are formed by a first and a second conducting strip respectively, the thicknesses of the strips at rest being denoted $e_1$ and $e_2$ respectively.

9. The device of claim 6, wherein the first and the second conducting elements are formed by a first and a second conducting strips respectively, the thicknesses of the strips at rest being denoted $e_1$ and $e_2$ respectively; and wherein the dimension $d_1$ at rest of the first interstitial space is significantly lower than the sum $e_1+e_2$ of the thicknesses at rest of the first and second conducting strips.

10. The device of claim 1, wherein the electrical connection between the first conducting element and the second conducting element is achieved without brazing or soldering.

11. The device of claim 1, housed in a box for use within an electrical switchboard.

12. The device of claim 1, the device forming a lightning arrester.

13. A device for providing protection for an electrical installation against overvoltages, comprising:

(a) at least one protection component with at least one first and one second power supply terminal;

(b) at least one first and one second connection pad designed to provide electrical connection of the device to the electrical installation;

(c) at least one first conducting element electrically connected to the first terminal of the protection component and one second conducting element electrically connected to the first connection pad, the first and second conducting elements are electrically connected to each other;

(d) at least one third conducting element electrically connected to the second terminal of the protection component and a fourth conducting element electrically connected to the second connection pad, the third and fourth conducting elements are electrically connected to each other;

(e) a first mounting delimiting a first interstitial space with a dimension fixed by construction that at least partially houses the first conducting element and the second conducting element, the size of the first interstitial space is such that the first and second conducting elements are held in contact with each other to make the electrical connection between the first and second conducting elements; and (f) a second mounting delimiting a second interstitial space with a dimension fixed by construction that at least partially houses the third conducting element and the fourth conducting element, the dimension of the second interstitial space is such that the third and fourth conducting elements are held in contact with each other to make the electrical connection between the third and fourth conducting elements, wherein the electrical connection between the first and second conducting elements and the electrical connection between the third and fourth conducting elements allow each a 8/20 current impulse up to 70 kA to pass therethrough.

14. The device of claim 13, housed in a box for use within an electrical switchboard.

15. The device of claim 13, wherein the first mounting includes two walls extending substantially parallel to each other and delimiting the first interstitial space, the dimension of the first interstitial space at rest is equal to the distance $d_l$ separating the walls, wherein the first and the second conducting elements are formed by a first and a second conducting strips respectively, the thicknesses of the strips at rest being denoted $e_l$ and $e_2$, respectively, and wherein the dimension $d_1$ at rest of the first interstitial space is significantly lower than the sum $e_l+e_2$ of the thicknesses at rest of the first and second conducting strips.

16. The device of claim 13, the device forming a lightning arrester.

17. A device for providing protection for an electrical installation against overvoltages, comprising:

(a) at least one protection component with at least one first and one second power supply terminal;

(b) at least one first and one second connection pad designed to provide electrical connection of the device to the electrical installation;

(c) at least one first conducting element electrically connected to the first terminal of the protection component and one second conducting element electrically connected to the first connection pad, the first and second conducting elements are electrically connected to each other;

(d) at least one third conducting element electrically connected to the second terminal of the protection component and a fourth conducting element electrically connected to the second connection pad, the third and fourth conducting elements are electrically connected to each other; and, (e) a box inside which the protection component is mounted, the box being made in one piece with:

(e1) a first mounting delimiting a first interstitial space with a dimension fixed by construction that at least partially houses the first conducting element and the second conducting element, the size of the first interstitial space is such that the first and second conducting elements are held in contact with each other to make the electrical connection between the first and second conducting elements; and with (e2) a second mounting delimiting a second interstitial space with a dimension fixed by construction that at least partially houses the third conducting element and the fourth conducting element, the dimension of the second interstitial space is such that the third and fourth conducting elements are held in contact with each other to make the electrical connection between the third and fourth conducting elements.

18. The device of claim 17, housed in a box for use within an electrical switchboard.

19. The device of claim 17, wherein the first mounting includes two walls extending substantially parallel to each other and delimiting the first interstitial space, the dimension of the first interstitial space at rest is equal to the distance $d_1$ separating the walls, wherein the first and the second conducting elements are formed by a first and a second conducting strips respectively, the thicknesses of the strips at rest being denoted $e_l$ and $e_2$, respectively; and wherein the dimension $d_1$ at rest of the first interstitial space is significantly lower than the sum $e_l+e_2$ of the thicknesses at rest of the first and second conducting strips.

20. The device of claim 17, the device forming a lightning arrester.

* * * * *